United States Patent
Pop, Sr.

(10) Patent No.: US 6,601,287 B2
(45) Date of Patent: Aug. 5, 2003

(54) MOTOR INCLUDING EMBEDDED PERMANENT-MAGNET ROTOR AND METHOD FOR MAKING SAME

(76) Inventor: Stephen L. Pop, Sr., 2264 Estabrook NW., Warren, OH (US) 44485

(*) Notice: Subject to any disclaimer, the term of this patent is extended or adjusted under 35 U.S.C. 154(b) by 0 days.

(21) Appl. No.: 10/134,954

(22) Filed: Apr. 29, 2002

(65) Prior Publication Data

US 2002/0116811 A1 Aug. 29, 2002

Related U.S. Application Data

(62) Division of application No. 09/850,477, filed on May 7, 2001, now Pat. No. 6,396,182, and a division of application No. 09/342,850, filed on Jun. 29, 1999, now Pat. No. 6,259,180, which is a division of application No. 09/084,562, filed on May 26, 1998, now Pat. No. 6,005,318, which is a division of application No. 08/675,399, filed on Jul. 2, 1996, now Pat. No. 5,771,566, which is a division of application No. 08/191,957, filed on Feb. 4, 1994, now Pat. No. 5,554,900.

(51) Int. Cl.[7] .............................................. H02K 15/03
(52) U.S. Cl. .............................. 29/596; 29/609; 29/732; 310/156; 310/214; 310/216
(58) Field of Search ........................ 29/596, 598, 609, 29/732, 607; 310/156, 216, 217

(56) References Cited

U.S. PATENT DOCUMENTS

| | | | |
|---|---|---|---|
| 1,948,829 A | 2/1934 | Reis | 310/156 |
| 2,192,985 A | 3/1940 | Reis | 310/156 |
| 2,255,477 A | 9/1941 | Tognola | 310/156 |
| 2,788,458 A | 4/1957 | Naul | 310/212 |
| 3,012,161 A | 12/1961 | Puder | 310/156 |
| 3,072,813 A | 1/1963 | Reijnst et al. | 310/156 |
| 3,169,203 A | 2/1965 | Lavin et al. | 310/156 |
| 3,221,194 A | 11/1965 | Blackburn | 310/156 |
| 3,320,454 A | 5/1967 | Kober | 310/156 |
| 3,401,280 A | 9/1968 | Lackey et al. | 310/211 |
| 3,671,788 A | 6/1972 | Knudson et al. | 310/156 |
| 3,908,265 A | 9/1975 | Heil et al. | 29/597 |
| 3,939,993 A | 2/1976 | Lingl, Jr. | 214/6 A |
| 3,979,821 A | 9/1976 | Noodleman | 29/598 |
| 4,127,786 A | 11/1978 | Volkrodt | 310/156 |
| 4,151,430 A | 4/1979 | Stark | 310/90 |
| 4,319,398 A | 3/1982 | Fukuzawa et al. | 29/598 |
| 4,322,648 A | 3/1982 | Ray et al. | 310/156 |
| 4,327,302 A | 4/1982 | Hershberger | 310/156 |
| 4,383,356 A | 5/1983 | Fichtner | 29/598 |
| 4,393,320 A | 7/1983 | Anderson | 310/156 |
| 4,434,546 A | 3/1984 | Hershberger | 29/598 |
| 4,543,506 A | 9/1985 | Kawada et al. | 310/156 |
| 4,564,777 A | 1/1986 | Senoo et al. | 310/156 |
| 4,568,846 A | 2/1986 | Kapadia | 310/156 |
| 4,631,807 A | 12/1986 | Kawada et al. | 29/598 |
| 4,663,551 A | 5/1987 | Weh et al. | 310/598 |
| 4,663,835 A | 5/1987 | Caillier, Sr. | 29/598 |
| 4,697,114 A | 9/1987 | Amemiya et al. | 310/156 |
| 4,709,179 A | 11/1987 | Banon et al. | 310/156 |

(List continued on next page.)

FOREIGN PATENT DOCUMENTS

| | | |
|---|---|---|
| EP | 0107317 A | 5/1984 |
| EP | 0126997 A | 12/1984 |
| EP | 0327470 A | 8/1989 |
| EP | 0430795 A | 6/1991 |
| FR | 2499326 | 8/1982 |

Primary Examiner—Gregory Vidovich
Assistant Examiner—Stephen Kenny
(74) Attorney, Agent, or Firm—Leydig, Voit & Mayer, Ltd.

(57) ABSTRACT

An electric motor including a permanent-magnet rotor having embedded magnets held in place by several segments. The embedded magnets are secured by segments including non-circular openings near their centers. Several non-magnetic, non-conductive bars extend through the non-circular openings of the segments to secure the segments in relation to the shaft. The motor is capable of producing high torque while only requiring a minimum amount of space.

10 Claims, 4 Drawing Sheets

U.S. PATENT DOCUMENTS

| | | | |
|---|---|---|---|
| 5,068,556 A | 11/1991 | Lykes et al. | 310/90 |
| 5,091,668 A | 2/1992 | Cuenot | 310/156 |
| 5,140,211 A | 8/1992 | Ucida | 310/156 |
| 5,157,297 A | 10/1992 | Uchida | 310/156 |
| 5,162,686 A | 11/1992 | Royer | 310/156 |
| 5,175,461 A | 12/1992 | Zigler et al. | 310/156 |
| 5,200,662 A | 4/1993 | Tagami | 310/261 |
| 5,554,900 A | 9/1996 | Pop, Sr. | 310/156 |
| 5,771,566 A | 6/1998 | Pop, Sr. | 29/598 |
| 5,907,208 A | 5/1999 | Kristen et al. | 310/261 |
| 6,005,318 A | 12/1999 | Pop, Sr. | 310/156 |
| 6,259,180 B1 | 7/2001 | Pop, Sr. | 310/156 |
| 6,396,182 B1 | 5/2002 | Pop, Sr. | 310/156.22 |

MOTOR INCLUDING EMBEDDED PERMANENT-MAGNET ROTOR AND METHOD FOR MAKING SAME

RELATED APPLICATIONS

This is a divisional of application Ser. No. 09/850,477, filed May 7, 2001, now U.S. Pat. No. 6,396,182 and which is a divisional of prior application Ser. No. 09/342,850, filed Jun. 29, 1999, U.S. Pat. No. 6,259,180, issued Jul. 10, 2001, which is a divisional of prior application Ser. No. 09/084,562, filed May 26, 1998, U.S. Pat. No. 6,005,318, issued Dec. 21, 1999, which is a divisional of prior application Ser. No. 08/675,399 filed Jul. 2, 1996, U.S. Pat. No. 5,771,566 issued Jun. 30, 1998, which is a division of application Ser. No. 08/191,957 filed Feb. 4, 1994, U.S. Pat. No. 5,554,900 issued Sep. 10, 1996. The entire disclosure of each of these prior applications is considered as part of the disclosure of this application and is hereby incorporated by reference.

FIELD OF THE INVENTION

This invention relates to an electric motor including a permanent-magnet rotor having embedded magnets held in place by several segments. More specifically, the invention relates to a motor capable of producing high torque while only requiring a minimum amount of space.

BACKGROUND OF THE INVENTION

Synchronous electric motors having permanent-magnet rotors have existed for some time. Many of the rotors that have been used in such electric motors have magnets that are mounted at the periphery of the rotor surface. In these motors, the rotor typically is made of a magnetically conductive material such as iron or the like. The magnetic flux available to produce force in connection with the magnetic fields in the stator is proportional to the surface area of the magnets on the outer surface of the rotor. In these motors, great care must be taken to mount the magnets in precise relation to the axis of the rotor and so as to maintain a smooth outer surface.

In operation, the flux lines from the magnets in these motors link across an air gap to the stator. The magnets are arranged so that adjoining rows of magnets have opposite magnetic poles facing outward. Thus, around the outside circumference of the rotor, the rows of magnets are arrayed north to south to north, and so on. Typically, the rows are also slightly skewed relative to the stator or the stator is slightly skewed relative to the rotor so as to minimize cogging that occurs as the magnets line up with the respective teeth of the stator. Since total magnetic flux for a magnet is proportional to its surface area, the total available torque for these types of motors is directly linked to the total available surface area of the outside of the rotor. Thus, this rotor arrangement is most useful where either the size of the motor (size of the diameter of the rotor) does not need to be small or the total available torque does not need to be large.

There are some motors where the permanent magnets are not mounted at the outside periphery of the rotor. An example of such a motor is shown in U.S. Pat. No. 4,697,114, issued Sep. 29, 1987, to Amemiya et al. In these motors, the permanent magnets are secured between magnetically conductive wedges which are secured in fixed relation to the shaft of the rotor. The wedges in these motors sometimes consist of sets of laminated plates held in place by fastening bolts that extend through them parallel to the axis of rotation of the motor and attach to steel end plates which are securely fitted to the shaft. In these motors, the inner surfaces of the wedges and permanent magnets are radially spaced from the shaft the entire length of the magnetized rotor.

In the aforementioned motors the diameter of the rotor must be sufficiently large to accommodate the air gap between the shaft and the magnets and wedges. This presents apparent problems in a lower available torque for a given diameter rotor and a larger overall size. In addition, the manner of mounting and the positioning of the magnets and wedges would appear to adversely affect the response time of the motor to rapid changes in the signal input (stiffness) along with providing relatively high inertia, eddy currents and diminished rotor efficiency.

In control systems, it is often desirable to use small high torque devices to operate various mechanical systems. In the past, where high torque was required but space was limited, system designers often opted to use hydraulic systems because of the lack of electric motors with sufficiently high torque to size ratios. As a result, there has been a need for an electric motor with high torque that can be used in relatively small spaces.

In applications such as robotics and the like, where response time is critical, there is additional need for electric motors that have high stiffness while not requiring a significant amount of space. In addition, such applications often require that the control system maintain a high energy efficiency.

Accordingly, one object of this invention is to provide a small electric motor including a permanent-magnet rotor having embedded magnets which has high torque to size ratio.

A related object of the invention is to provide an electric motor including a permanent-magnet rotor having embedded magnets which has high stiffness while requiring a minimum amount of space.

Another related object of the invention is to provide an electric motor including a permanent-magnet rotor having embedded magnets which achieves high torque and stiffness while maintaining high efficiency.

Another related object of the invention is to provide an electric motor including a permanent-magnet rotor having embedded magnets which achieves smoothness of operation at low speeds.

SUMMARY OF THE INVENTION

A feature of the invention is an electric motor including a permanent-magnet rotor having embedded magnets secured by segments including non-circular openings near their centers.

Another feature of the invention is an electric motor including several non-magnetic, non-conductive bars which extend through the non-circular openings of the segments to secure the segments in relation to the shaft.

Another feature of the invention is an electric motor where the opening near the center of the segments is generally shaped like an elongated diamond.

Another feature of the invention is an electric motor where the segments are in abutment with the shaft.

Another feature of the invention is an electric motor where the shaft is constructed of non-magnetic material, such as stainless steel.

Another feature of the invention is an electric motor where the securing bars are formed of high tensile strength fiberglass.

Still another feature of this invention is a method for assembling an electric motor including a permanent-magnet rotor having embedded magnets.

Another feature of this invention is a method for assembling an electric motor wherein the rotor shaft is force fit into the center of an assembly including the segments, magnets, bars and retainer rings so that rotor acts as a single beam in operation.

Other objects and advantages will become apparent from the following detailed description when taken in conjunction with the drawings, in which:

DETAILED DESCRIPTION OF THE PREFERRED EMBODIMENTS

While the invention will be described in connection with a preferred embodiment, it will be understood that the invention is not limited to that embodiment. On the contrary, the invention covers all alternatives, modifications and equivalents within the spirit and scope of the invention as defined by the appended claims. For example, the preferred embodiment is described in terms of an electric motor; however, the invention herein may take the form of a motor or a generator.

Figure 1:
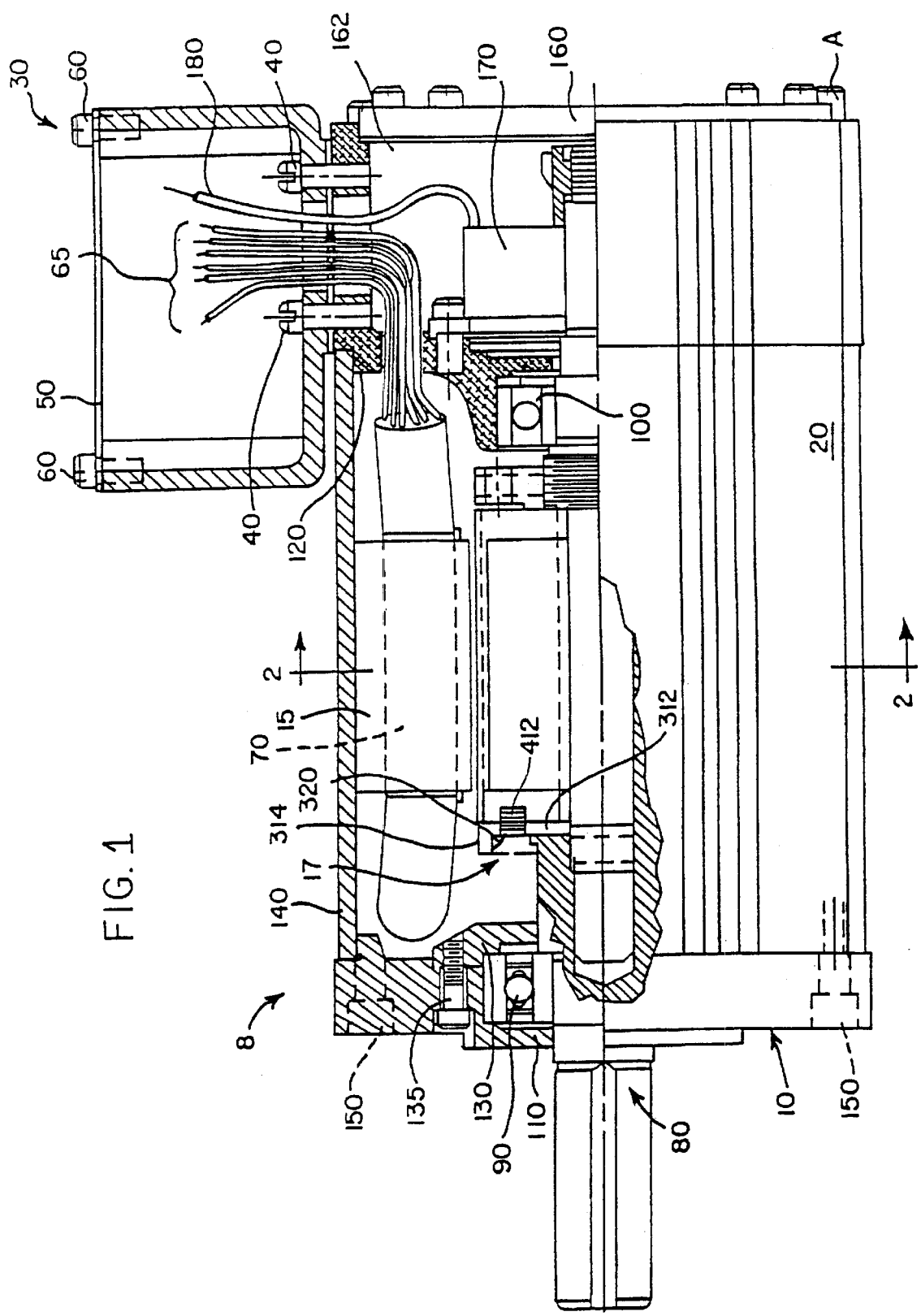
FIG. 1 is a side view, partially in section, of an electric motor including a permanent-magnet rotor having embedded magnets and employing teachings of the present invention.

Turning first to FIG. 1, the motor assembly generally indicated as 8 includes an electrical motor 10 within an outer housing 20 and a terminal box 30 which are connected to one another as by machine screws 40. The motor 10 further includes a stator generally indicated at 15 and a rotor generally indicated at 17. The terminal box 20 includes a cover 50, secured by screws 60, which has an opening (not shown) through which a power supply (not shown) extends to power the motor 10. As shown, wires pass through aligned openings in the housing 20 and the base of the terminal box 30. The first set of wires, referred to hereinafter to as stator lead wires 65, connects with stator windings 70 within the stator 15. As shown, there are a total of six stator lead wires 65 which provide for Y or Δ three-phase operation of the motor 10. Although the preferred embodiment provides for three-phase operation, it is noted that other multi-phase or single phase configurations could be implemented.

As shown in FIG. 1, the rotor 17 includes a drive shaft 80 which rotates about a central axis, being rotatably supported by a forward bearing 90 and a spaced rear bearing 100. The bearings 90 and 100 are supported on a front end plate 110 and an interior supporting plate 120, respectfully. The front end plate 110 secures and locates the bearing 90 by clasping the bearings with a clamping piece 130. The clamp piece 130 is secured by means of a set of screws 135 which are accessible from the front of the plate 110.

Front end plate 110 attaches to an intermediate casing 140 by means of screws 150 near the outer edges of the front end plate 110 and the front edge of the casing 140. The housing 140 also is secured to the interior supporting plate 120 by screws which extend through the housing. Of course, in any circumstance where screws are described to secure two component pieces together, any appropriate connecting device may be used such as bolts, rivets, or an integrated assembly weld. A rear end plate 160 is secured to the interior supporting plate 120 so as to define an enclosed rear area 162 therebetween. Mounted within this rear area and in near proximity to shaft 80 is a brushless tachometer and commutator 170 and/or other sensor which produces a signal indicative of the speed of rotation and/or position of the shaft 80. As shown in FIG. 1, the brushless tachometer and commutator 170 includes signal wires 180 which extend into the terminal box 30 and connect with the appropriate circuitry which ultimately powers the stator windings 70. The brushless tachometer and commutator 170 is used to monitor position and/or speed of the rotor 17 and is an integral part to any application where the motor 10 is used as a servo. In the preferred embodiment, the brushless tachometer and commutator 170 may be of the kind produced by Servo-Tek Product Companies as TACHSYN® (model number T6621) for a six pole motor.

Figure 2:
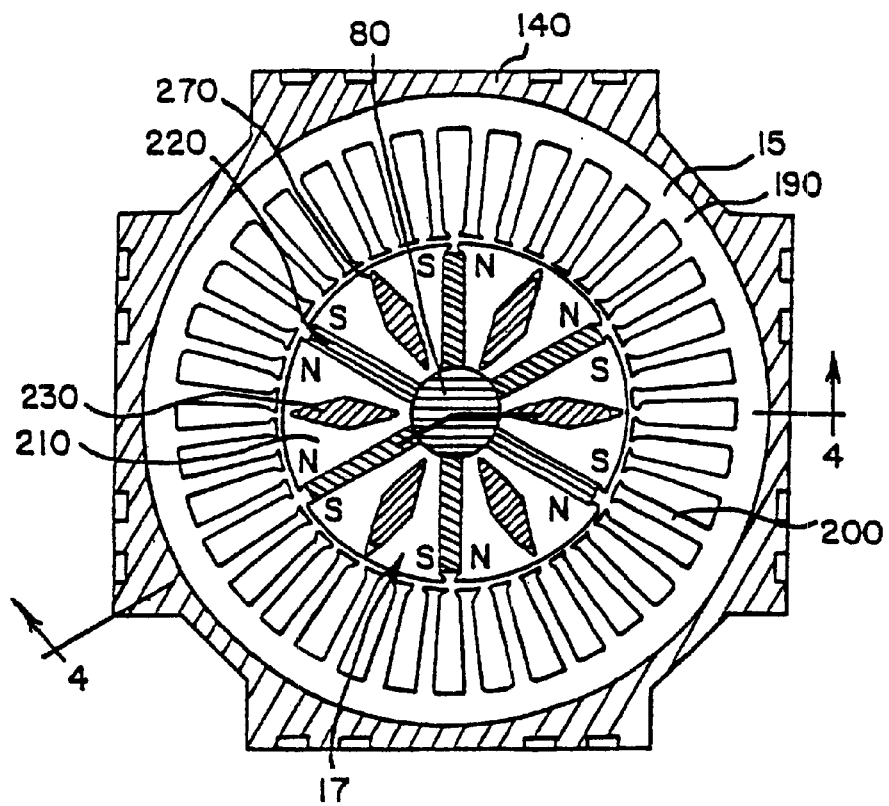
FIG. 2 is a sectional view of the motor taken along line 2—2 of FIG. 1 and enlarged to show greater detail.

FIG. 2 shows a cross-section of the rotor 17, stator 15 and intermediate housing 140. The stator 15 includes a stator core 190 which is comprised of a number of laminations each having substantially the same dimensions. As shown, the stator core 190 has thirty-six teeth 200 (only one of the teeth shown in FIG. 2 is numbered) which extend inwardly to form a circular cylindrical contour at an inner diameter. The teeth 200 are substantially equidistant from one to the next around the inner circumference and, as such, there are six stator teeth per every 60 degrees with respect to the center axis.

In an exemplary embodiment, the diameter of the inner contour of the stator core 190 may be very small. The distance between the teeth 200 of the stator core 190 along the inner circumference may be correspondingly small. The dimensions of the stator core 190 can be as small as manufacturing procedures permit. Further, in the preferred embodiment, the teeth 200 are skewed by one tooth over the length of the rotor 17. Skewing teeth 200 in this way minimizes torque ripple and provides for smooth operation at low speeds and prevents cogging.

In order to facilitate the magnetic circuit with the rotor 17, each lamination of the stator core 190 is made of a material that exhibits high magnetic conductivity and low hysterisis losses, such as magnetic silicon steel. In addition, each lamination is electrically insulated so that eddy currents are limited. In the preferred embodiment, each lamination of the stator core 190 is stamped from 2–3% silicon steel and laminated with a non-conductive coating, such as M36 steel with C5 coating sold by Tempel Steel. Although the laminations of the preferred embodiment are produced using a stamping process, it will be recognized that other processes may be used.

To further facilitate the magnetic circuit, the inner ends of the teeth 200 of the stator core 190 are broadened circumferentially. The intermediate housing 140 is formed separately of a non-magnetic material such as aluminum, stainless steel, etc.; however, magnetic materials may be used. In this manner, the magnetic circuit is structured so as to obtain maximum efficiency. The stator windings 70 (not shown in FIG. 2) fill the spaces between the teeth 200 of the stator core 190, from the outer most radial end to the inner area adjacent the broadened inner end surfaces of the teeth 200.

Figure 3:
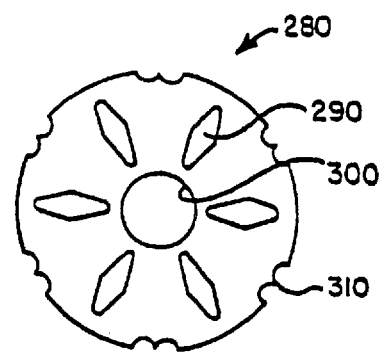
FIG. 3 is a plan view of a retainer ring lamination used in the rotor assembly of FIG. 1.
Figure 5:
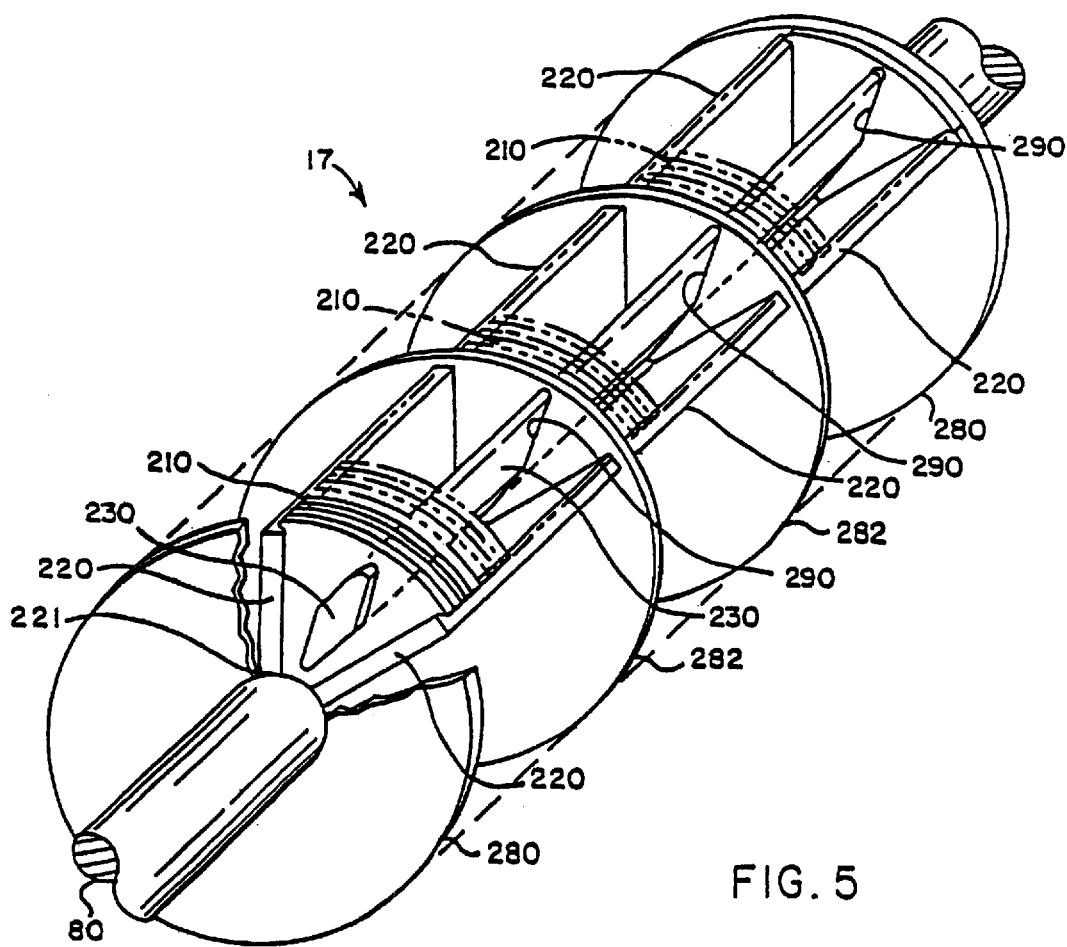
FIG. 5 is an enlarged schematic perspective of the rotor showing one axial set of the segments related embedded magnets, and supporting bars.
Figure 4:
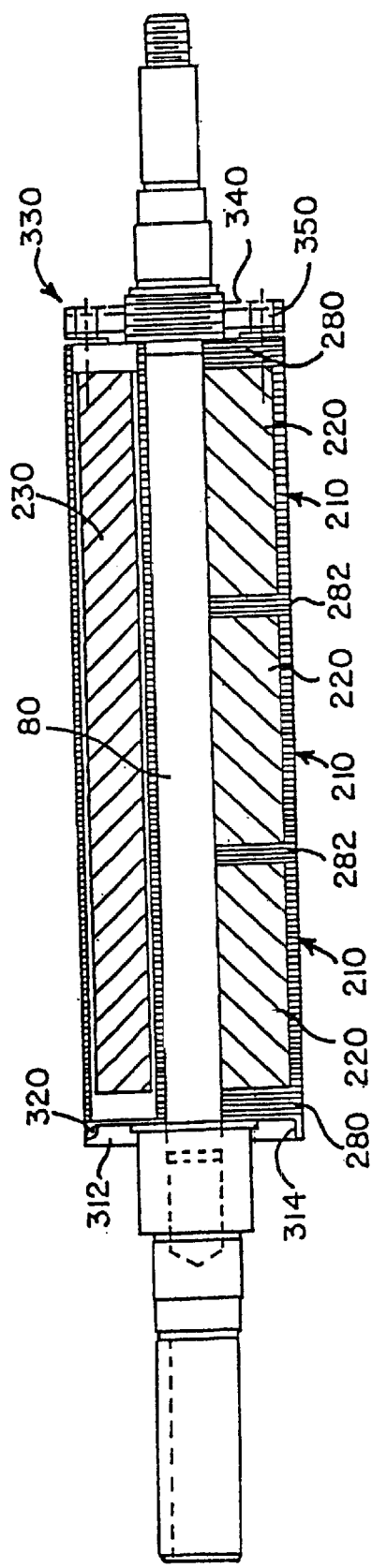
FIG. 4 is a partial sectional view of the rotor of FIG. 1 taken along line 4—4 of FIG. 2.
Figure 6:
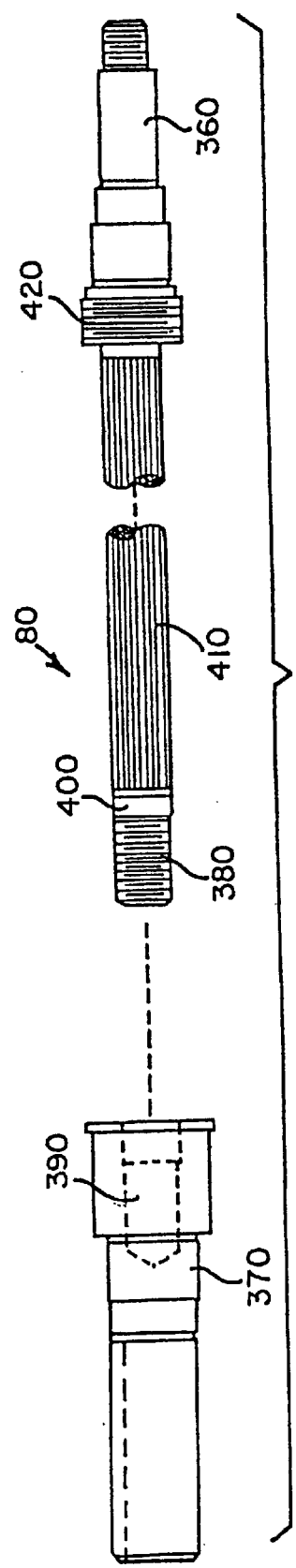
FIG. 6 is an exploded view of a shaft used in the rotor assembly of FIG. 1.

Referring to FIGS. 2, 4 and 5, the illustrated rotor 17 includes the central axial drive shaft 80 and a plurality of segments 210 corresponding to a multiple of the number of poles in the motor, e.g., at least six segments 210 for a six-pole motor. Additional sets of the segments may be added in axial alignment with the first set about the center shaft, depending upon the size of the individual components and the space and power parameters for the motor. The rotor 17 includes three axially aligned sets of six segments, with only one segment and related magnets of each set being shown in the schematic illustration of FIG. 5 for clarity. This embodiment optimally produces 13 Nm of torque with the rotor 17 having an outside diameter of approximately 49.5 mm and three sets of segments as shown in FIGS. 4, 5 and 6. The individual segments 210 are supported on securing bars 230. The bars 230 extend parallel to the axis of the rotor 17 through central openings 270 in the segments 210 and are supported by retainer rings 280 which are affixed to and supported on the shaft 80. The retainer rings 280 (see FIG. 3) include at least the end retainer rings 280 as part of the end assemblies at each end of the rotor 17, with additional retainer rings 282 between each set of the segments 210 when the rotor 17 includes multiple sets as in the illustrated embodiment.

The magnets 220 are thin flat rectangular magnets each magnetized through its thickness so that its opposite poles are at its opposite major planar faces. One such magnet 220 is positioned at each interface between adjacent segments 210 as best seen in FIG. 2 and is held in position by engagement of the respective abutting segments 210. Each of the magnets 220 thus is disposed to extend along and parallel to the shaft 80 over the length of the respective segments 210 and radially of the shaft, i.e., with its central plane extending parallel to and radially of the axis of the shaft 80. The magnets 220 are oriented such that like poles abut each side of each segment 210 whereby the segments 210 are polarized alternately N-S progressively about the circumference of the rotor 17. Thus, any single magnetic circuit made by the magnets 220 utilizes part of one segment and part of the adjacent segment in connecting with the stator 15. The magnets 220 need be of only a minimum thickness to provide the minimum physical strength necessary for reasonable handling and mounting, i.e., to avoid undue fragility of the magnet elements per se. Each magnet 220 extends from an inner edge 221 closely adjacent the surface of the shaft 80 to an outer edge which is adjacent the outer edge of the segments 210 and thus the surface of the rotor 17, being separated therefrom only by narrow retainer protrusions or ears 260 of the segments 210 which partially overlie the outer edges of the magnets 220 for radial retention purposes. The air gap between the opposed retaining ears 260 should be slightly greater than the air gap between the rotor 17 and the stator 15 to insure directing of the magnetic flux across the air gap to the stator instead of crossing between the rotor segments. In an alternative embodiment, recesses are provided along the sides of the segments 210 which face the magnets 220. In this alternative embodiment, shims are inserted into the recesses to position and grip the magnets 220.

In the illustrated rotor, the bars 230 hold the segments 210 in place with their inner edges firmly seated against the surface of the shaft 80. The shaft 80, segments 210, bars 230 and retainer rings 230, 232 thus form an integrated structure which provides substantial strength and stiffness even with a shaft 80 of relatively small diameter. This, in turn, permits using radial magnets 220 and segments 210 of large radial extent relative to the outside diameter of the rotor, thereby providing greater available flux with good flux control and attendant high power potential with a small rotor in a small motor.

Figure 2A:
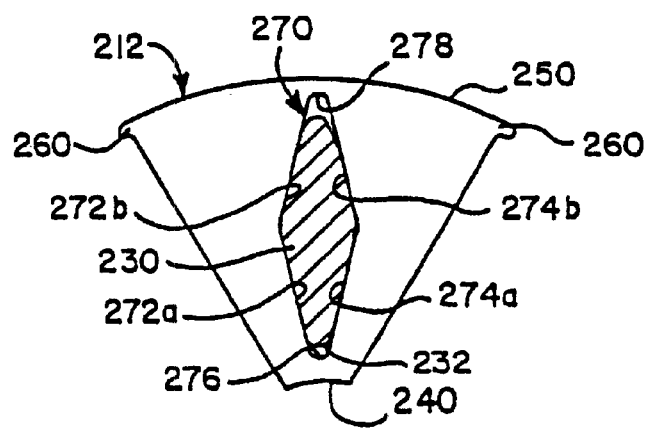
FIG. 2A is an enlarged plan view of a lamination used in forming the segments of the rotor of the motor in FIG. 1.

Each of the segments 210 is comprised of stacked laminations 212 having substantially the same configuration and dimensions. As shown in FIG. 2A, each lamination 212 is generally pie-shaped in configuration and includes an inner concave curved edge 240 to conform to the outer circumferential surface of the shaft 80 and an outer convex curved edge 250 to conform to the outside circumferential surface selected for the rotor 17. That is, curved edge 240 defines an arc of a radius substantially corresponding to the radius of the shaft 80, and the curved edge 250 defines an arc corresponding to the design radius of the rotor 17.

Each lamination 212 further includes a non-circular opening 270 formed near the center of the lamination (as measured radially between edges 240 and 250). The opening 270 is of a generally elongated diamond shape. It is symmetrical about the center radius of the lamination 212 and oriented with its major axis extending radially of the lamination, being of a length and position to substantially bifurcate the lamination 212 into symmetrical portions at each side of the opening 270. Of course, opening 270 could be in the form of other shapes such as a rectangle, triangle or other radially elongated geometrical shape. The inner two adjacent sides 272a, 274a of the illustrated opening 270 are substantially at 30 degrees relative to each other as are the two outer adjacent sides 272b, 274b. Where the two inner and outer sides connect, they form an included angle of 120 degrees. As shown, the inner and outer corners 276, 278 of opening 270 are rounded. In the preferred embodiment, the inner corner 276 is of substantially greater radius of curvature than the outer corner 278. By not rounding the outer corner 278 as much as the inner corner 276, opening 270 is easily extended farther radially toward the outer edge 250. Similarly, by rounding the inner corner 276 more than the outer corner 278, opening 270 does not extend as far inward toward end 240. The particular benefits of shaping opening 270 as described will be discussed further below.

As with the stator core 190, each lamination 212 of the segments 210 is stamped from magnetic material. To reduce eddy currents, each lamination 212 is covered with an electrically non-conductive material. In the preferred embodiment, the laminations 212 are made of 2–3% silicon steel and coated with non-conductive coating, such as M36 steel with C5 coating manufactured by Tempel Steel. Powdered metal sintered segments with silicon may replace the thin laminations.

The shape of the segments 210 directs the flux lines emanating from the surfaces of the magnets 220 to the outer surface 250 of each of the segments 210. Magnets 220 are of a type having sufficient magnetic strength to saturate or nearly saturate the material of each lamination comprising the segments 210 at the outer edge 250. In addition, magnets 220 are sufficiently heat resistant so as to not lose a significant amount of magnetism as the rotor 17 becomes hot (nearing 300 degrees Fahrenheit). In the preferred embodiment, the magnets 220 are made of Neodymium-Iron-Boron (NdFeB) having an energy product (BHmax) of $30 \times 10^6$ (Gauss Oehrsteds (GOe)). However, other magnets could be used in place of such preferred magnets. For instance, where greater temperature resistance is desired, Samarium-Cobalt (SmCo) magnets may be used. In general, given certain operating requirements such as maximum temperature and minimum flux, a particular magnet can be chosen.

Besides securing the segments 210, the openings 270 and the bars 230 assist in directing the magnetic flux emanating from the magnets 220 through the segments 210. In accordance with the invention, the bars 230 are constructed of a material having high tensile strength which is both non-magnetic and electrically non-conductive. In the preferred embodiment, bars 230 are made of pultruded glass fiber with thermoset resin binder, commonly referred to as fiberglass. The pultrusion process orients the continuous glass fibers substantially parallel to the length of the bar. Although the preferred embodiment utilizes bars made of Class H fiberglass (suitable for use at 180° C.), bars 230 could be made of any nonmagnetic, non-conductive material having sufficient strength and weight characteristics. Being that the bars 230 are electrically non-conductive, circulating currents are prevented, thereby improving the efficiency of the motor 10. For example, there is no loss in efficiency due to the production of eddy currents. Further, the bars 230 do not permit the circulating currents which might create an inductive rotor (squirrel cage).

With the structure of the rotor 17, including the openings 270 and using non-magnetic and non-conductive bars 230, it is believed that the magnetic flux emanating from the surfaces of the magnets 220 is directed to generate an even distribution of magnetic flux across the outer surface 250 of the segments 210. As noted above, such distribution is preferably strong enough to saturate the material of the segments 210 at their outer surfaces 250, thereby providing the maximum flux to link with the stator 15. As shown in FIG. 2, magnetic flux present at the outer surface 250 of the segments 210 crosses an air gap that is present between the rotor 17 and the stator 15 to create a magnetic circuit. By directing the magnetic flux as described, the flux crosses the air gap on substantially radial lines (with respect to the axis of rotation) and generates the maximum flux lines per area for maximum available torque. Accordingly, the distance that must be traveled by the flux is minimized as is the magnetic resistance as seen at the air gap.

At the position depicted in FIG. 2, a magnetic circuit begins at one of the magnets 220. It is believed that the magnetic flux travels through one half of one of the segments 210, being directed by the opening 270 and the bars 230, to form an even distribution across one half of the outer surface 250 of one of the segments 210. At that point, the magnetic flux crosses the air gap present between the rotor 17 and the stator 15. To assist in directing the magnetic flux, the shaft 80 is constructed of a non-magnetic material so that the magnetic flux of the magnets 220 will not utilize the shaft 80 as a means for completing a magnetic circuit, but will be directed outwardly toward the outer surface 250 of the segments 210. Once across the air gap, the magnetic flux emanating from one-half of a segment 210 links instantaneously with the equivalent of three teeth 200 of the stator 15 and is linked to the next set of three teeth 200 of the stator 15. The magnetic flux then links back across the air gap to one half of the outer surface 250 of the adjacent one of the segments 210. From the outer surface 250, the magnetic flux is directed through the adjacent one of the segments 210 to connect with the other side of the same one of magnets 220 that the original magnetic flux lines emanated from, thereby completing the magnetic circuit. The retainer rings 282 are of essentially the same construction as the rings 280.

FIGS. 2 and 2A show that the bars 230 do not fill the openings 270. As shown, small gaps are left near the inner corners 276 and outer corners 278 of openings 270. The primary mechanical force contact between the bars 230 and the segments 210 is along the inner angled surfaces 272a, 274a of openings 270, i.e., in retaining the segments against centrifugal forces. For this reason, the inner corner 276 of openings 270 has a greater radius of curvature than does the outer corner 278 of openings 270. Under normal conditions, the rounded inner edges 232 of bars 230 can come in contact with the inner corner 276 of openings 270. In such instances, the surface area available to transmit retaining force is increased over that which would exist if the inner corner 276 were not rounded.

The outside corner 278 of opening 270 has a radius of curvature that is smaller than the inner corner 276. Optimally, the opening 270 would not include an outer corner but would extend all the way to the outer surface 250 in order to direct the magnetic flux lines as described above. However, in order to avoid complications in manufacturing, the opening 270 is extended as far as permissible in a radial direction while still permitting the laminations of the segments 210 to be stamp formed. Additionally, the outer corner 278 of the opening 270 does not have to be rounded to the degree of the inner corner because the outer surfaces of opening 270 do not encounter any forces.

Although the preferred embodiment includes bars 230 generally having an elongated diamond shape, other shapes of bars 230 could be utilized. For example, a circular, triangular, etc. rod could be inserted in opening 270. Of course, in the case where openings 270 are shaped other than as elongated diamonds, the bars 230 would be made in a shape that could fit through the openings 270 and must be of sufficient rigidity to support the segments.

FIG. 3 shows a retainer ring 280 including openings 290 and a center hole 300. The retainer ring 280 fits over the shaft 80 and secures the bars 230 in relation thereto. Retainer ring 280 is made of non-magnetic material such as stainless steel, though other similar materials would suffice. Since the retainer ring 280 also can be a lamination, several essentially identical plates are secured together to support and locate the rods 230. In the preferred embodiment, as with the other laminations, each retainer ring 280 is made of thin stainless steel plates which are covered with an insulative coating after being stamp formed. As further shown in FIG. 3, the retainer rings 280 include notches 310 along their periphery. In one embodiment, the notches 310 are used to fusion weld several retainer plates together. In other embodiments, the retainer rings are cut from material of the total required thickness and, as a result, notches 310 are eliminated and no fusion welding is required. Of course, where retainer ring plates are welded together, several other means of connecting them may be used.

The openings 290 of the retainer rings 280 are shaped slightly differently than the openings 270 of the segments 210. Unlike the openings 270, the primary mechanical forces exerted by the securing bars 230 against the retainer rings 280 are along the outer surfaces of the openings 290, i.e., in retaining the bars 230 and the segments 210 and magnets 200 against centrifugal forces. Accordingly, the outer corners of openings 290 have a larger radius of curvature than the inner corners to increase the engagement surface area of the bars 230 therealong.

FIG. 4 shows a partial cross-sectional view of an assembled rotor along line 4—4 as shown in FIG. 2 with three sets of segments 210 and two interior retaining rings at 282. In a simpler preferred embodiment as in FIG. 1 where the rotor 17 is shorter, there is no need for the interior retainer rings 282 and, consequently, they are not present. The securing bar 230 extends the length of the segments 210 to connect with the retainer rings 280 at either end of the segments 210 regardless of the number of sets of segments.

As described, the invention may be practiced utilizing differing numbers of sets of magnets (modules). Each magnetic module is approximately 2 inches long when the outside diameter of the rotor 17 being approximately 49.5 mm with retainer rings on either side. Although the magnetic modules are described in approximately two inch lengths, it is to be understood that other lengths, both smaller and larger could be utilized. Utilizing this modular approach provides motors (rotor of approximately 49.5 mm diameter) that optimally produce approximately 4 Nm of torque with one modular segment, 7 Nm of torque with two modular segments, 10 Nm of torque with three modular segments, 13 Nm of torque with four modular segments, etc. As is apparent, the available torque increases proportionally to the number of magnetic modules that are employed.

A balance drive plate 312 is provided at one end of the retainer rings 280 to balance the rotor 17 by placing material 320, such as epoxy putty, on its inside rim 314 (shown in FIG. 1). In the preferred embodiment, the drive plate 312 is made of stainless steel or an equivalent non-magnetic material.

Near the other end of the rotor 17 is a clamp and lock screw assembly 330. As shown, the clamp 340 screws onto the shaft 80 in an axial direction where an outer surface of the shaft 80 contacts an inner surface of the clamp 340. The clamp provides threaded bores 350 that align with the outside surface of the retainer rings 280. A lock screw (not shown) is screwed into each bore 350 to contact the retainer rings 280 and compress the assembly of laminations into tight alignment.

FIG. 6 shows the shaft 80 in its disassembled form. As shown, the rear shaft 360 and the front shaft 370 connect together to form shaft 80 by means of a threaded screw portion 380 and a complementary threaded receiving portion 390. The rear shaft 360 includes a taper portion 400 and a knurled portion 410. As shown, the knurls of the portion 410 extend in an axial direction along the outer surface of the rear shaft 360. The rear shaft 360 additionally includes a threaded portion 420 which accommodates the clamp and lock screw assembly 330 as described above. In the preferred embodiment, the rear shaft 360 is made of stainless steel or the like while front shaft 370 is made of cold finish carbon steel or the like.

To manufacture the rotor 17, an assembly of retainer rings 280 (and rings 282 as necessary), segments 210 and magnets 220 are aligned on guide means (such as guide pins) that extend through the openings 270 of the segments 210 and the openings 290 of the retainer rings 280, 282. Next, a cylinder having an inside diameter which is roughly equivalent to the diameter of the final rotor 17 is inserted over the outside diameter of the assembly. The cylinder pushes each segment 210 towards the center axis until contact is made with magnets 220.

Next, the bars 230 are inserted into openings 290 of the retainer rings 280, 282 and through the openings 270 of the segments 210. As the bars 230 are inserted, the guide pins are pressed out of the assembly. The bars 230 are tapered slightly at their lead ends to facilitate insertion into the assembly. Once the bars 230 are inserted into the assembly, the rear shaft 360 is pressed into the center openings 300 in the retainer rings 280, 282 and through the center opening formed by the segments 210 and magnets 220. Of course, the tapered end (see screw portion 380 and tapered portion 400 in FIG. 6) of the rear shaft 360 is inserted into the assembly first. The components are sized such that the shaft sections 400, 410 force the segments 210 and retained magnets radially outward to firmly press the segments outwardly against the bars 230 and thereby to press the bars 230 outwardly into firm seating at the outer ends of the openings 290 in the retainer rings, i.e., in a radial compressive relationship. This forms a prestressed rigid rotor structure. While being inserted, the knurl portion 410 of the rear shaft 360 apparently assists in maintaining proper alignment of the various component parts and creates an interference fit with the laminations for transfer of torque similar to a spline.

Once rear shaft 360 is inserted, the assembly is removed from the cylinder and the receiving portion 390 of front shaft 370 is screwed onto the rear shaft 360 by means of the threaded portion 380. Before the front shaft 370 is screwed onto the rear shaft 360, the balance drive plate 312 is welded to the front shaft 370 or secured by some other adequate means (see FIG. 4). Then, after the front and rear shafts are assembled, set screws 412 (see FIG. 1) are added through balance drive plate 312 and into the adjacent retainer rings 280. Next, after being thoroughly cleaned, a metal bonding adhesive is applied to the assembly to permeate and permanently bond the assembly. In the preferred embodiment, a polymer cement marketed as Loctite grade 290 is used. With all of the components in place, the assembly is placed in a lathe or grinder, if necessary, and any extending portions along the outside surface of the rotor 17 are machined off. If such machining is required, then putty may be inserted into the air gap between the ears 260 of the segments to prevent metal fragments from accumulating. After the cement polymerizes, the rotor 17 is machined for a final time.

In accordance with the invention, it is believed that the rotor 17 acts as a solid body as a result of its construction, thereby exhibiting exception stiffness. In addition, the rotor 17 can be constructed of a small size while producing great magnetic flux at its outer surface and high torque.

What is claimed is:

1. A method of forming a rotor for use in an electrical device having a high torque to size ratio, comprising:

forming an annular array of multiple pie-shaped lamination segments each having radially extending sides and a radially outward peripheral edge and a radially inward peripheral edge, said segments being arrayed around a center axial opening and with plate magnets oriented radially of said array between said segments, said magnets being magnetized through their thicknesses so that the magnetic poles of each magnet are at side surfaces thereof which face the two adjacent segments and with the poles of the magnets facing each side of each segment being of the same polarity;

connecting the laminations of each of said segments to one another in areas radially outward of said shaft without magnetically conductive components other than said segments and said magnets, providing a rotor drive shaft, assembling said drive shaft and said array of segments with said drive shaft extending through said center axial opening, affixing a first abutment support to said drive shaft in a predetermined position;

assembling said annular array of segments on said shaft whereby said shaft extends through said center axial opening and one end of said segments abuts said first abutment support;

compressing said laminations against said first abutment support by moving a second abutment support against the opposite end of said segments; and securing said second abutment support to said shaft adjacent said other end of said segments, maintaining each of said first and second abutment supports in compressive relation against the respective end of said segments solely by axial forces transmitted to said shaft by said first and second abutment supports, whereby said segments, said abutment supports and said drive shaft form a rigid rotor that provides high torque output in an electric device using said rotor.

2. A method of forming a rotor as in claim 1 wherein said compressing step includes threaded advancement of at least a portion of said second abutment against said opposite end of said segments.

3. A method of forming a rotor as in claim 2 wherein a portion of said second support is in screw threaded engagement with said shaft and is moved thereby in a direction axially of said shaft while supported on said shaft.

4. A method of forming a rotor as in claim 3 wherein said second abutment support includes at least one element that is threadably engaged with said portion of said second support and extends into abutment with said opposite end of said segments.

5. A method of forming a rotor as in claim 1 wherein said first abutment support is a drive plate, and including the step of affixing said one end of said segments to said drive plate.

6. A method of forming a rotor as in claim 5 including the step of welding said drive plate to said shaft.

7. A method of forming a rotor as in claim 1 which includes the step of providing firm radially outward compressive forces against said radially inward peripheral edges of said laminations by said shaft.

8. A method of forming a rotor as in claim 1 wherein each of said magnets extends radially from closely adjacent said drive shaft to closely adjacent said outward peripheral edges of the respective adjacent lamination segments.

9. A method of forming a rotor as in claim 8 wherein said drive shaft is a small diameter shaft and each of said laminations is firmly seated against said drive shaft.

10. A method of forming a rotor as in claim 1 that includes the step of permeating the assembly of said shaft, said segments, said magnets and said abutment supports with bonding adhesive for further bonding the components of said rotor together.

* * * * *